United States Patent
Hamamura et al.

(10) Patent No.: US 7,734,166 B2
(45) Date of Patent: Jun. 8, 2010

(54) PHOTOGRAPHING APPARATUS, PHOTOGRAPHING METHOD AND A COMPUTER READABLE MEDIUM OF INSTRUCTIONS FOR CONTROLLING THE PHOTOGRAPHING APPARATUS

(75) Inventors: Toshihiro Hamamura, Yokohama (JP); Toshiyuki Tanaka, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 11/965,921

(22) Filed: Dec. 28, 2007

(65) Prior Publication Data
US 2008/0159727 A1 Jul. 3, 2008

(30) Foreign Application Priority Data
Dec. 28, 2006 (JP) ............................. 2006-356035

(51) Int. Cl.
G03B 3/00 (2006.01)
G03B 3/10 (2006.01)
(52) U.S. Cl. ........................................ 396/104; 396/121
(58) Field of Classification Search ................ 396/104, 396/121, 123
See application file for complete search history.

(56) References Cited

U.S. PATENT DOCUMENTS

| | | | | |
|---|---|---|---|---|
| 5,321,248 A | * | 6/1994 | Sensui | 250/201.8 |
| 5,604,562 A | * | 2/1997 | Aoyama | 396/79 |
| 5,729,771 A | * | 3/1998 | Ohtaka | 396/113 |
| 5,758,210 A | * | 5/1998 | Hamada et al. | 396/121 |
| 7,145,598 B2 | * | 12/2006 | Maeda | 348/222.1 |

* cited by examiner

Primary Examiner—Rodney E Fuller
(74) Attorney, Agent, or Firm—Drinker Biddle & Reath LLP (57) ABSTRACT

A photographing apparatus and method prevent a resolution of a peripheral portion of an image from being degraded with a simple structure. These employ an in-focus state detector for detecting evaluation values for auto in-focus operation representing an in-focus state of an image from a first in-focus state detection region disposed on a center portion of the image, and at least one second in-focus state detection region disposed on a peripheral portion of the image, a flat subject determiner that determines whether a subject is flat based on the detection result of the evaluation values for auto in-focus operation, a flat subject focusing position calculator that calculates a final focusing position based on the evaluation values when the subject is determined as being flat, and a three-dimensional subject focusing position calculator that calculates a final focusing position based on the evaluation value when the subject is not flat.

20 Claims, 11 Drawing Sheets

| FOCUS | | EVALUATION VALUES FOR AUTO IN-FOCUS OPERATION OF THREE-DIMENSIONAL SUBJECT | | | | | | |
|---|---|---|---|---|---|---|---|---|
| DISTANCE TO SUBJECT | FOCUSING POSITION | LEFT | CENTER | RIGHT | UPPER LEFT CORNER | UPPER RIGHT CORNER | LOWER LEFT CORNER | LOWER RIGHT CORNER |
| INFINITY | 0 | 81 | 90 | 90 | 62 | 54 | 50 | 55 |
| 15.00 m | 1 | 90 | 100 | 100 | 60 | 56 | 55 | 60 |
| 7.50 m | 2 | 90 | 125 | 100 | 62 | 58 | 60 | 70 |
| 5.00 m | 3 | 99 | 140 | 110 | 64 | 62 | 65 | 75 |
| 3.75 m | 4 | 90 | 145 | 100 | 68 | 65 | 68 | 81 |
| 3.00 m | 5 | 99 | 150 | 110 | 72 | 80 | 75 | 90 |
| 2.50 m | 6 | 108 | 155 | 120 | 88 | 94 | 95 | 112 |
| 2.14 m | 7 | 126 | 150 | 140 | 104 | 108 | 105 | 126 |
| 1.88 m | 8 | 135 | 155 | 150 | 120 | 152 | 105 | 121 |
| 1.67 m | 9 | 153 | 160 | 170 | 168 | 180 | 113 | 135 |
| 1.50 m | 10 | 162 | 170 | 180 | 200 | 252 | 117 | 140 |
| 1.36 m | 11 | 180 | 180 | 200 | 280 | 306 | 113 | 135 |
| 1.25 m | 12 | 198 | 220 | 220 | 340 | 342 | 118 | 142 |
| 1.15 m | 13 | 225 | 260 | 250 | 380 | 310 | 120 | 144 |
| 1.07 m | 14 | 288 | 300 | 320 | 320 | 252 | 127 | 153 |
| 1.00 m | 15 | 360 | 420 | 400 | 280 | 180 | 135 | 162 |
| 0.94 m | 16 | 450 | 500 | 500 | 200 | 144 | 165 | 198 |
| 0.88 m | 17 | 540 | 700 | 600 | 160 | 108 | 195 | 234 |
| 0.83 m | 18 | 576 | 850 | 640 | 120 | 90 | 225 | 270 |
| 0.79 m | 19 | 540 | 950 | 600 | 100 | 72 | 315 | 378 |
| 0.75 m | 20 | 450 | 850 | 500 | 80 | 65 | 375 | 450 |
| 0.71 m | 21 | 360 | 700 | 400 | 72 | 55 | 525 | 630 |
| 0.68 m | 22 | 270 | 500 | 300 | 64 | 54 | 630 | 765 |
| 0.65 m | 23 | 216 | 400 | 240 | 60 | 48 | 710 | 855 |
| 0.63 m | 24 | 180 | 300 | 200 | 56 | 45 | 620 | 765 |
| 0.60 m | 25 | 144 | 250 | 160 | 50 | 40 | 525 | 630 |
| 0.58 m | 26 | 135 | 200 | 150 | 45 | 36 | 375 | 450 |
| 0.56 m | 27 | 120 | 180 | 140 | 40 | 32 | 300 | 360 |
| 0.54 m | 28 | 100 | 160 | 130 | 35 | 27 | 225 | 270 |
| 0.52 m | 29 | 90 | 150 | 125 | 30 | 18 | 188 | 225 |
| 0.50 m | 30 | 80 | 140 | 115 | 20 | 15 | 150 | 180 |
| IN-FOCUS POSITION | | 18 | 19 | 18 | 13 | 12 | 23 | 23 |

| FOCUS | | EVALUATION VALUES FOR AUTO IN-FOCUS OPERATION OF FLAT SUBJECT | | | | | | |
|---|---|---|---|---|---|---|---|---|
| DISTANCE TO SUBJECT | FOCUSING POSITION | LEFT | CONTER | RIGHT | UPPER LEFT CORNER | UPPER RIGHT CORNER | LOWER LEFT CORNER | LOWER RIGHT CORNER |
| INFINITY | 0 | 83 | 81 | 73 | 40 | 15 | 40 | 45 |
| 15.00 m | 1 | 86 | 91 | 83 | 50 | 20 | 48 | 50 |
| 7.50 m | 2 | 114 | 132 | 154 | 65 | 40 | 50 | 65 |
| 5.00 m | 3 | 122 | 135 | 147 | 70 | 70 | 60 | 70 |
| 3.75 m | 4 | 125 | 141 | 140 | 81 | 80 | 64 | 78 |
| 3.00 m | 5 | 133 | 157 | 158 | 94 | 103 | 93 | 101 |
| 2.50 m | 6 | 148 | 160 | 165 | 104 | 154 | 115 | 176 |
| 2.14 m | 7 | 129 | 148 | 125 | 116 | 153 | 135 | 164 |
| 1.88 m | 8 | 139 | 161 | 131 | 145 | 135 | 128 | 183 |
| 1.67 m | 9 | 152 | 160 | 170 | 136 | 162 | 150 | 195 |
| 1.50 m | 10 | 158 | 163 | 146 | 151 | 173 | 154 | 183 |
| 1.36 m | 11 | 159 | 180 | 182 | 141 | 172 | 155 | 189 |
| 1.25 m | 12 | 189 | 214 | 194 | 127 | 165 | 155 | 177 |
| 1.15 m | 13 | 227 | 259 | 231 | 162 | 173 | 145 | 210 |
| 1.07 m | 14 | 276 | 305 | 328 | 144 | 187 | 178 | 202 |
| 1.00 m | 15 | 386 | 413 | 416 | 146 | 184 | 189 | 209 |
| 0.94 m | 16 | 445 | 499 | 513 | 187 | 219 | 207 | 262 |
| 0.88 m | 17 | 620 | 696 | 694 | 235 | 266 | 245 | 317 |
| 0.83 m | 18 | 774 | 847 | 831 | 262 | 322 | 320 | 384 |
| 0.79 m | 19 | 852 | 943 | 925 | 359 | 436 | 402 | 495 |
| 0.75 m | 20 | 769 | 849 | 854 | 457 | 539 | 485 | 613 |
| 0.71 m | 21 | 620 | 698 | 669 | 639 | 749 | 697 | 836 |
| 0.68 m | 22 | 442 | 496 | 486 | 772 | 946 | 844 | 1008 |
| 0.65 m | 23 | 363 | 394 | 392 | 352 | 1021 | 927 | 1136 |
| 0.63 m | 24 | 260 | 293 | 267 | 746 | 922 | 846 | 1007 |
| 0.60 m | 25 | 231 | 252 | 252 | 622 | 759 | 709 | 827 |
| 0.58 m | 26 | 176 | 198 | 222 | 447 | 545 | 512 | 614 |
| 0.56 m | 27 | 155 | 182 | 194 | 341 | 450 | 385 | 456 |
| 0.54 m | 28 | 152 | 151 | 123 | 259 | 332 | 308 | 370 |
| 0.52 m | 29 | 131 | 142 | 154 | 232 | 282 | 269 | 305 |
| 0.50 m | 30 | 125 | 143 | 138 | 164 | 231 | 185 | 233 |
| IN-FOCUS POSITION | | 19 | 19 | 19 | 23 | 23 | 23 | 23 |

PHOTOGRAPHING APPARATUS, PHOTOGRAPHING METHOD AND A COMPUTER READABLE MEDIUM OF INSTRUCTIONS FOR CONTROLLING THE PHOTOGRAPHING APPARATUS

CROSS-REFERENCE TO RELATED PATENT APPLICATIONS

This application claims the benefit of Japanese Patent Application No. 2006-356035, filed on Dec. 28, 2006, in the Japanese Intellectual Property Office, the disclosure of which is incorporated herein in its entirety by reference.

BACKGROUND OF THE INVENTION

1. Field of the Invention

The present invention relates to a photographing apparatus and a photographing method, and more particularly, to a photographing apparatus and a photographing method that can prevent a resolution at peripheral portions of an image from being degraded.

2. Description of the Related Art

In auto-focusing (AF) cameras which can perform auto-focus adjustment, when the focusing is performed based on a center of a photographing region, defocusing of peripheral portions of the photographing region can become worse due to aberrations in a photographing lens. Therefore, in Japanese Laid-open Patent No. 2006-189580, an average field curvature ratio, that is an average value of field curvature ratios with respect to an entire region of a photographing surface, is calculated, and the photographing lens is moved according to the average field curvature ratio.

However, in a case where a principal subject does not exist on the peripheral portion of the image, for example, when a general three-dimensional subject is photographed, there is no need to focus on the peripheral portion. In this case, defocusing of the peripheral portion can be required in order to emphasize the perspective of the subject. When the method of calculating the average field curvature ratio disclosed in the Japanese Laid-open Patent Publication No. 2006-189580 is applied, the processing needed to perform the photographing is excessively increased, and it thus requires much time to photograph the subject.

Also, in a case where a sheet of paper on which letters are printed is photographed, the center of the photographing region and the peripheral portion of the photographing region must be clearly focused, and thus, it is desirable to restrict degradation of resolution at the peripheral portions.

SUMMARY OF THE INVENTION

The present invention provides a photographing apparatus having a simple structure that can prevent a resolution at peripheral portions of an image from being degraded, and a photographing method.

An embodiment of the present invention thus provides a photographing apparatus including an in-focus state detector for detecting evaluation values for auto in-focus operation representing an in-focus state of a photographing image from a first in-focus state detection region disposed on a center portion of the photographing image, and at least one second in-focus state detection region disposed on a peripheral portion of the photographing image; a flat subject determiner that determines whether a subject to be photographed is a flat subject (e.g., a substantially flat subject) or not based on the detection result of the evaluation values for auto in-focus operation; and a flat subject focusing position calculator that calculates a final focusing position based on the evaluation values for auto in-focus operation obtained from the first and second in-focus detection regions, when the subject is determined as a flat subject by the flat subject determiner. The apparatus further includes a three-dimensional subject focusing position calculator that calculates a final focusing position based on the evaluation value for auto in-focus operation obtained from the first detection region, when it is determined that the subject is not a flat subject by the flat subject determiner.

According to the above apparatus, an evaluation value for auto in-focus operation is detected from a first in-focus detection region disposed on a center portion of the photographed image and one or more second in-focus detection region disposed on a peripheral portion of the photographed image. In addition, it is determined whether the subject is a flat subject or not based on a detection result of the evaluation value for auto in-focus operation. In a case where the subject is determined to be the flat subject, a final focusing position is calculated based on the evaluation values for auto in-focus operation from the first and second in-focus detection regions. In addition, in a case where the subject is determined not to be the flat subject, the final focusing position is calculated based on only the evaluation values for auto in-focus operation from the first in-focus detection region. Therefore, the final focusing position is determined so that peak of the evaluation values for the auto in-focus operation of the center in-focus detection regions and the in-focus state focusing positions of the peripheral in-focus detection regions can exist in a range of the predetermined allowable defocused amount, and thus, the resolution of the peripheral portion can be improved without excessively degrading the resolution of the center portion.

The flat subject determiner may also determine whether the subject is a flat subject based on a difference between a focusing position where the evaluation value for auto in-focus operation of the first in-focus detection region is a maximum and a focusing position where the evaluation value for auto in-focus operation of the second in-focus detection region is a maximum. In addition, when the difference between the focusing position where the evaluation value for auto in-focus operation of the first in-focus detection region and the focusing position where the evaluation value for auto in-focus operation of the second in-focus detection region is within the range of the allowable defocused amount, it can be determined that the subject is the flat subject.

The photographing apparatus may further include a display unit displaying the photographing image, such that the first in-focus detection region may be displayed on the display unit with the photographing image, and the second in-focus detection region is not displayed on the display unit. According to this arrangement, since the second in-focus detection region is not displayed on the display unit, the resolution of the peripheral portion of the flat subject can be improved while the user does not recognize the second in-focus detection region.

The photographing apparatus may further include a diaphragm value controller that changes the diaphragm value based on the determination result of the flat subject determiner. According to this arrangement, the allowable defocused amount can be expanded by reducing the diaphragm value, and thus, the resolution of the peripheral portion of the image can be improved.

The photographing apparatus may further include a contour emphasizing controller that changes a process of emphasizing a contour of the image based on the determination result of the flat subject determiner. Therefore, the resolution of the peripheral portion of the image can be improved by performing the contour emphasizing operation.

The photographing apparatus may further include a posture determiner that determines a posture of the photographing apparatus based on the evaluation values for auto in-focus operation of the first and second in-focus detection regions. According to this arrangement, a posture of the photographing apparatus can be determined, and thus, the exposure can be optimally adjusted according to the posture of the photographing apparatus.

Another embodiment of the present invention provides a photographing method comprising the operations of detecting evaluation values for auto in-focus operation, which represent in-focus states, from a first in-focus detection region on a center portion of a photographing image and at least one second in-focus detection region on a peripheral portion of the photographing image; determining whether a subject to be photographed is a flat subject based on the result of detecting the evaluation values for auto in-focus operation from the first and second in-focus detection regions; calculating a final focusing position based on the evaluation values for auto in-focus operation from the first and second in-focus detection regions if the subject is determined as a flat subject; and calculating a final focusing position based on the evaluation value for the auto in-focus operation obtained from the first in-focus detection region if the subject is determined to not be a flat subject.

In determining whether the subject is a flat subject, the flat subject may be determined based on a difference between a focusing position where the evaluation value for auto in-focus operation of the first in-focus detection region is a maximum and a focusing position where the evaluation value for auto in-focus operation of the second in-focus detection region is a maximum.

The photographing method may further include the operation of displaying the photographing image, wherein the first in-focus detection region is displayed with the photographing image, and the second in-focus detection region is not displayed.

In determining whether the subject is a flat subject, diaphragm value may be changed based on the result of determining whether the subject is a flat subject. In determining whether the subject is a flat subject, a process of emphasizing a contour of the image may be changed based on the result of determining whether the subject is a flat subject.

The photographing method may further include the operation of determining a posture of the photographing apparatus based on the evaluation values for auto in-focus operation of the first and second in-focus detection regions.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, embodiments of the present invention will be described with reference to accompanying drawings. In the drawings, like reference numerals denote like elements.

Figure 1:
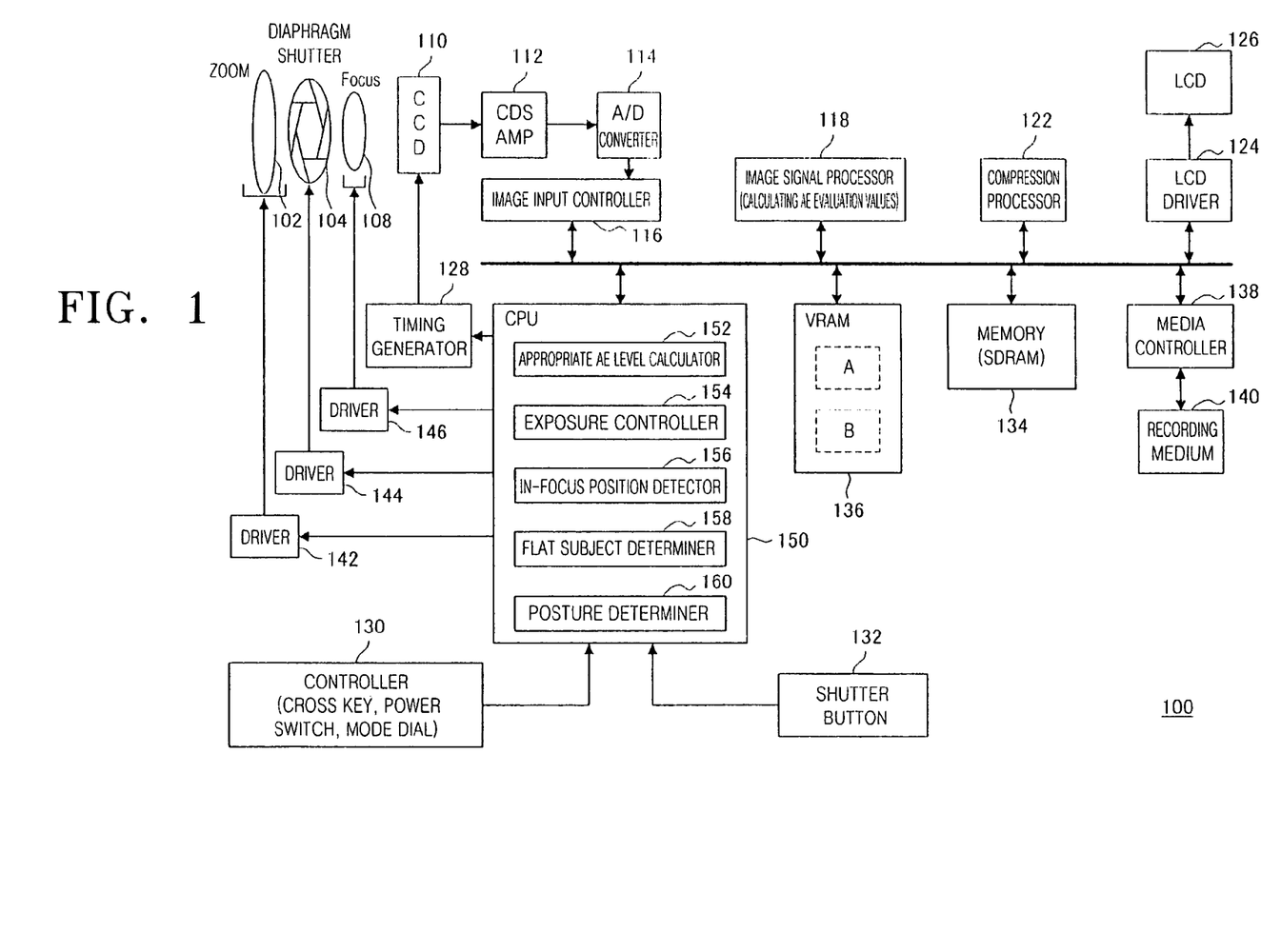
FIG. 1 is a diagram illustrating an example of a structure of a photographing apparatus according to an embodiment of the present invention.

FIG. 1 is a diagram showing an example of a structure of a photographing apparatus according to an embodiment of the present invention. Referring to FIG. 1, the photographing apparatus 100 according to this exemplary embodiment includes a zoom lens (group) 102, a combined diaphragm and shutter 104, a focus lens (group) 108, a charge coupled device (CCD) 110 as an imaging device, an amplifier integrated correlated double sampling (CDS) circuit 112, an analog/digital (A/D) converter 114, and an image input controller 116. The photographing apparatus 100 further comprises an image signal processor 118, a compression processor 122, a liquid crystal display (LCD) driver 124, an LCD 126, a timing generator 128, a central processing unit (CPU) 150, a controller 130, a shutter button 132, a memory 134, a video random access memory (VRAM) 136, a media controller 138, a recording medium 140, and drivers 142, 144, and 146.

The zoom lens 102, the combined diaphragm and shutter 104, and the focus lens 108 are driven by actuators that are controlled by the drivers 142, 144, and 146, respectively. The zoom lens 102 in this example is moved back and forth along an optical axis direction, and changes a focal distance continuously. The combined diaphragm and shutter 104 controls an exposure time of the CCD 110 when an image is photographed, and at the same time, controls an amount of light incident into the CCD 110. The focus lens 108 is moved back and forth along the optical axis direction, and controls the focus of the image formed on the CCD 110. The CCD 110 is a device for converting the light incident through the zoom lens 102, the combined diaphragm and shutter 104, and the focus lens 108 into electric signals.

In addition, in this embodiment, the CCD 110 is used as an imaging device, and the present invention is not limited thereto, that is, a complementary metal oxide semiconductor (CMOS) device or other imaging sensors can be used as the photographing device instead of using the CCD 110. The CMOS device can convert the light from a photographing subject into an electric signal faster than the CCD does, and thus, a time taken for processing a combination of images after photographing the images can be reduced.

The CDS circuit 112 is a circuit in which a CDS circuit that is a kind of sampling circuit for removing noise of the electric signal output from the CCD 110 and an amplifier that amplifies the electric signal after removing the noise are integrated. In this embodiment, the circuit, in which the CDS circuit and the amplifier are integrated, is used, however, the CDS circuit and the amplifier can be separated to operate independently.

The A/D converter 114 converts the electric signal generated in the CCD 110 into a digital signal, and generates raw data of the image (image data). The image input controller 116 controls an input of the raw data of the image (image data) generated by the A/D converter 114 into the memory 134.

The image signal processor 118 calculates an evaluation value for auto-focusing (AF evaluation value) as contrast information from the image data output from the CCD. In addition, the image signal processor 118 compensates a gain of the light amount, processes an edge of the image (contour emphasizing process), and controls a white balance with respect to the image data output from the CCD 110.

The compression processor 122 compresses the image data output from the CCD 110 as image data of an appropriate format. The compression format can be a reversible format or a nonreciprocal format. As an example of the compression format, the image data can be converted into Join Photographing Experts Group (JPEG) format or JPEG 2000 format.

The LCD 126 displays a live view before performing the photographing operation, setting screen of the photographing apparatus 200, or the photographed image. The image data or the information of the photographing apparatus 100 can be displayed on the LCD 126 using the LCD driver 124.

The timing generator 128 inputs a timing signal into the CCD 110. That is, the operation of the CCD 110 is controlled by the timing signal of the timing generator 128. The timing generator 128 can make the CCD 110 operate for a specific period of time only, and thus, allow the CCD 110 to have a function of electronic shutter.

The CPU 150 performs a signal-based command with respect to the CCD 110 or the CDS circuit 112, or performs an operation-based command according to the operations of the controller 130 and the shutter button 132. In this embodiment, one CPU is formed, however, the signal-based command and the operation-based command can be performed in separate CPUs.

The controller 130 includes a member for performing the operation of the photographing apparatus 100 or performing various settings when the photographing is performed. The member disposed in the controller 130 includes a power button, a cross button for selecting a photographing mode or a photographing drive mode and setting effect parameters, and a selection button.

The shutter button 132 is a button for performing the photographing operation. When the shutter button 132 is in a half-pushed state (hereinafter, the half-pushed state of the shutter button 132 is referred to as SH1), an AF operation for driving the focus lens 108 onto a focusing position, and when the shutter button 132 is full-pushed (hereinafter, the full-pushed state of the shutter button 132 is referred to as SH2 state), an exposure of the CCD 110 is performed and the subject is photographed.

The memory 134 temporarily stores the photographed images. The memory 134 has a storage capacity that can store a plurality of images. The reading/writing of the images from/onto the memory 134 are controlled by the image input controller 116.

The VRAM 136 maintains the contents displayed on the LCD 126, and a resolution or the maximum number of color emission of the LCD 126 is dependent on the capacity of the VRAM 136. The recording medium 140 records the photographed image. Input/output of the images into/from the recording medium 140 are controlled by the media controller 138. A memory card that is a card type memory device, in which the data is recorded in a flash memory, can be used as the recording medium 140.

The CPU 150 includes an appropriate auto exposure (AE) level calculator 152, an exposure controller 154, an in-focus position detector 156, a flat subject determiner 158, and a camera posture determiner 160. The appropriate AE level calculator 152 performs an auto exposure of the photographing apparatus 100, and obtains an exposure value (EV). The appropriate AE level calculator 152 calculates an AE evaluation value of the photographing and the AE evaluation value can be calculated by the image signal processor 118.

The exposure controller 154 determines a diaphragm value and a shutter speed when the subject is photographed based on the AE evaluation value calculated by the appropriate AE level calculator 154. The driver 144 is controlled by the determined diaphragm value and the shutter speed.

The in-focus position detector 156 detects a focusing position of the subject from the evaluation value for auto in-focus operation of the image data generated in the image signal processor 118 when the image light is incident into the CCD 110 from the subject.

The flat subject determiner 158 determines whether the subject is a flat subject or not from the in-focus position of the subject detected by the in-focus position detector 156. As can be appreciated by one skilled in the art, the term "flat subject" can also refer to and be interpreted as a "substantially flat subject." In addition, the camera posture determiner 160 determines the posture of the photographing apparatus 100 at the in-focus position of the subject detected by the in-focus position detector 156. In addition, the CPU 150 calculates a final focusing position in each of the cases where the subject is determined as the flat subject and determined as a three-dimensional subject, and then, transmits a command for driving the focus lens 108 onto the final focusing position to the driver 146.

Figure 2:
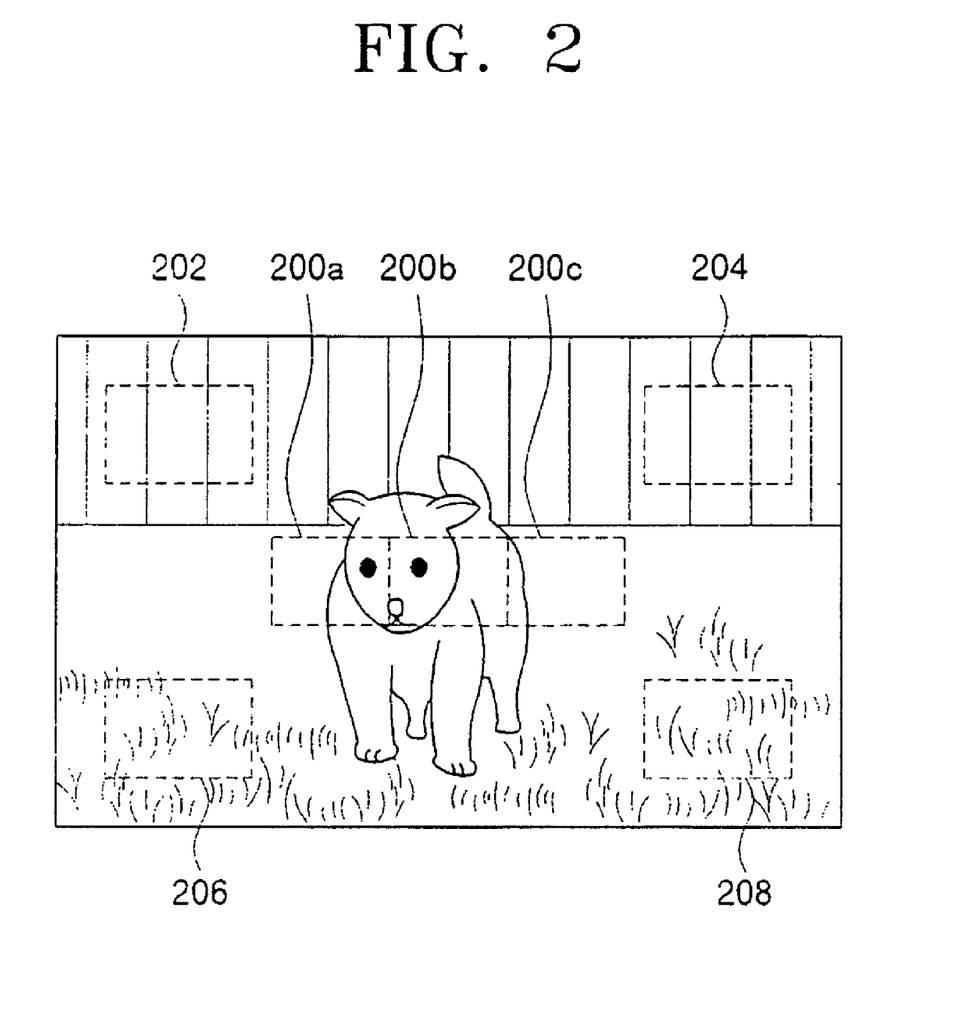
FIG. 2 is a figure showing an example of a detection region of an in-focus position (in-focus detection region) formed in a region of an image to be photographed.

FIG. 2 is a figure showing an example of detection regions of the in-focus positions (in-focus detection regions 200 through 208) formed in the photographing image region. As shown in FIG. 2, three in-focus detection regions 200a, 200b, and 200c are formed on a center portion of the photographing image region, and four in-focus detection regions 202, 204, 206, and 208 are formed on a peripheral portion of the photographing image region.

The in-focus detection regions 200a, 200b, and 200c are arranged in a row in a horizontal direction on the center portion of the photographing image region. In addition, the in-focus detection regions 202, 204, 206, and 208 are formed at the four corners of the photographing image regions. The three in-focus detections regions 200a, 200b, and 200c on the center portion are displayed on the LCD 126 or a finder (not shown) of the photographing apparatus 100. The four in-focus detection regions 202, 204, 206, and 208 on the peripheral portion are not displayed on the LCD 126 or on the finder. Therefore, a user of the photographing apparatus 100 can recognize the positions of the in-focus detection regions 200a, 200b, and 200c on the screen, however, the user cannot recognize the in-focus detection regions 202, 204, 206, and 208.

Figure 3:
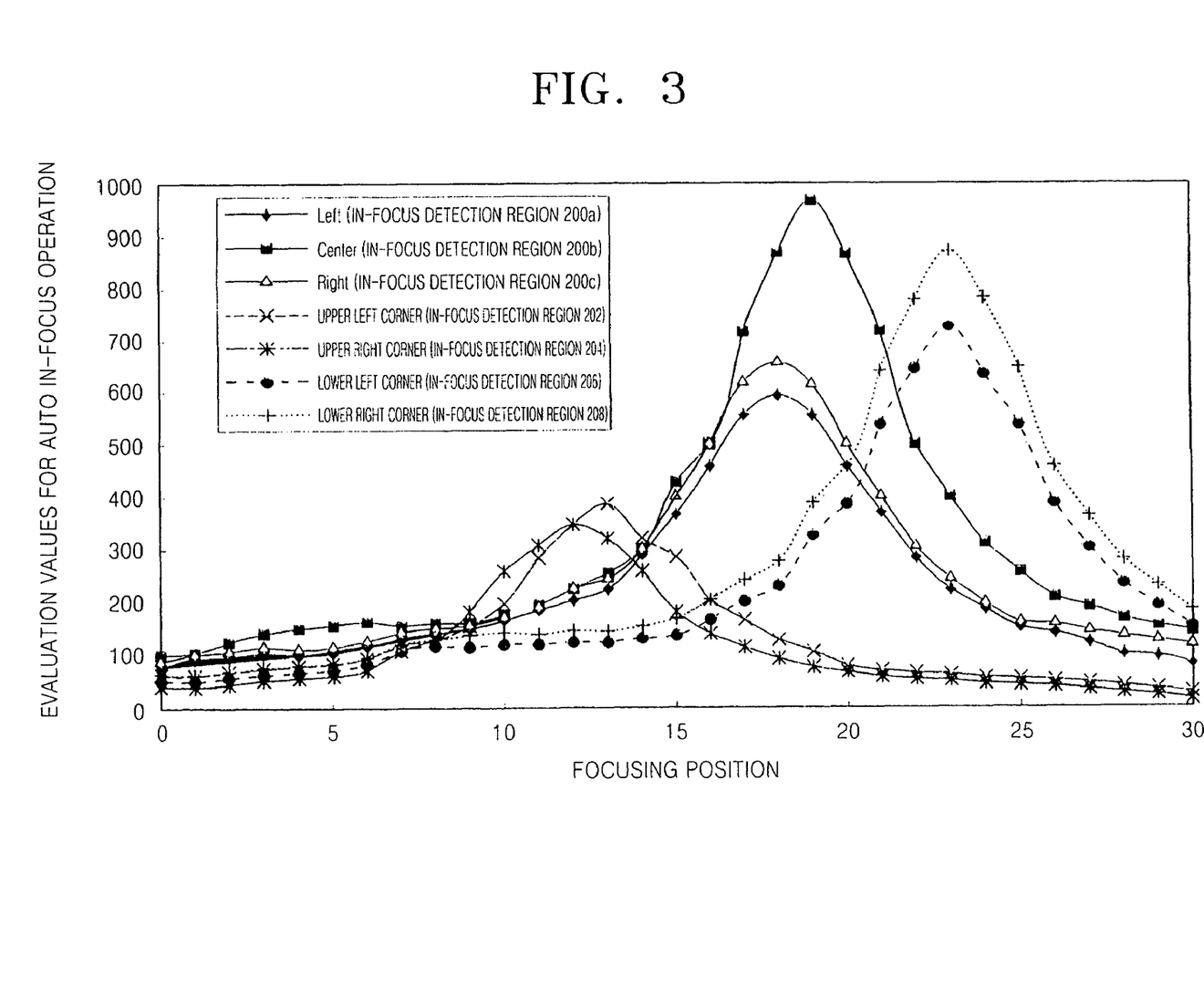
FIG. 3 is a graph illustrating exemplary evaluation values for auto in-focus operation obtained in the in-focus detection regions when the subject of FIG. 2 is photographed.

The evaluation value for auto in-focus operation is calculated from the image data output from the CCD 110 onto each of the in-focus detection regions 200a, 200b, 200c, 202, 204, 206, and 208. FIG. 3 is a graph showing exemplary evaluation values for the auto in-focus operation obtained from the in-focus detection regions 200a, 200b, 200c, 202, 204, 206, and 208 when the subject of FIG. 2 is photographed. In FIG. 3, a vertical axis represents the evaluation value for the auto in-focus operation, and a horizontal axis represents focusing positions (distances to the subject). In addition, FIG. 4 is a table showing exemplary evaluation values for the auto in-focus operation and the focusing positions (distances to the subject) corresponding to each other.

Figure 4:
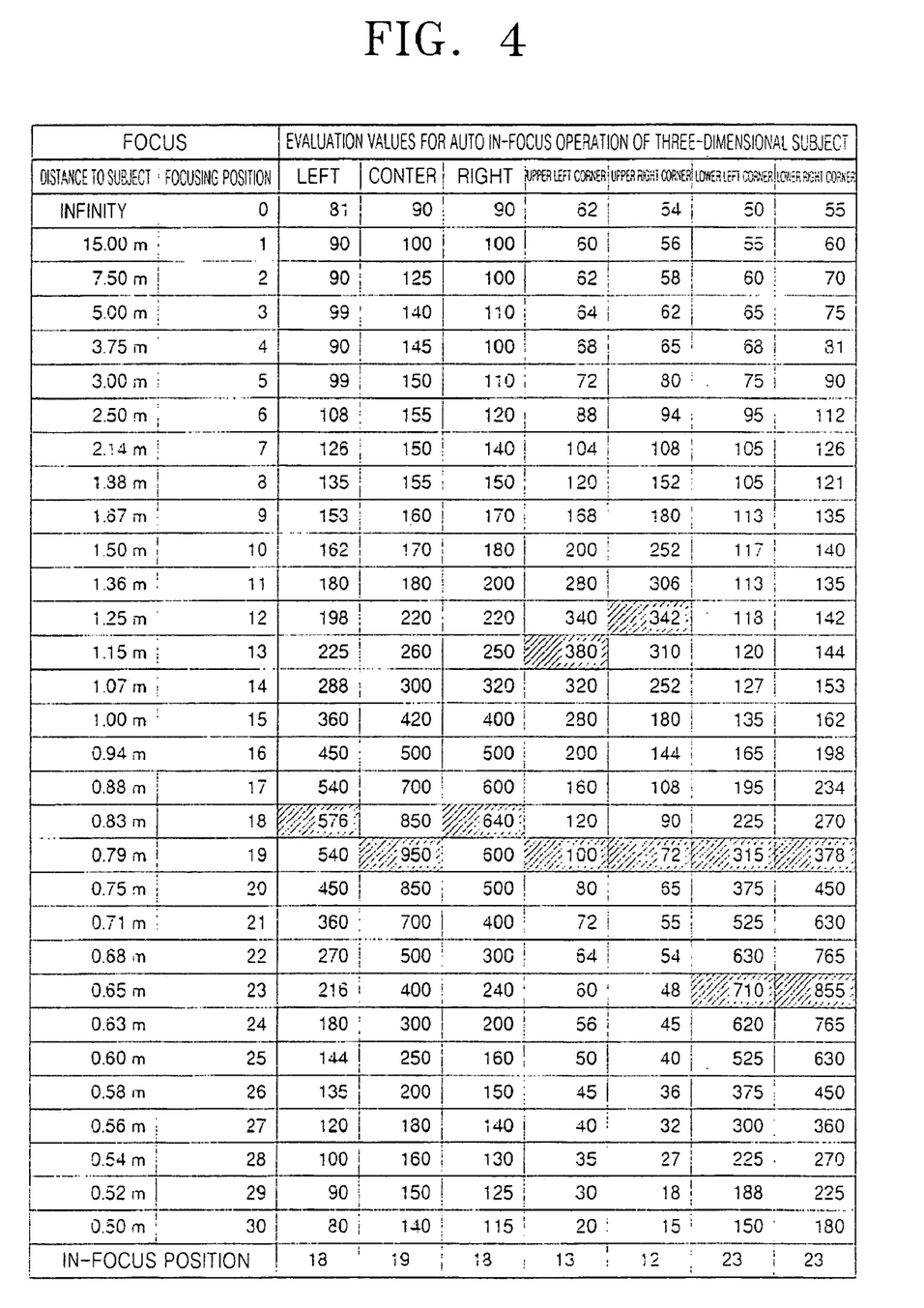
FIG. 4 is a table showing exemplary the evaluation values for the auto in-focus operation of FIG. 3 and data including focusing positions (distances to subject)

As shown in FIGS. 3 and 4, when the focus lens 108 is driven, the evaluation values for the auto in-focus operation with respect to each of the steps of the focusing positions from infinity to a minimum focal length (0.5 m) are obtained. The focusing position represents the position of the focus lens 108. The farthest position of the focus lens 108 is set as 0, the step increases when the focus lens moves, and when the position of the focus lens is on the nearest position (0.5 m), the step becomes the maximum value (which is equal to focusing position 30 as shown in FIG. 4).

In each of the in-focus detection regions 200a, 200b, 200c, 202, 204, 206, and 208, the image is clearly focused, that is, in an in-focus state, at the position of the focus lens 108 where the evaluation value for the auto in-focus operation is the largest. Here, the focusing position in the in-focus state is referred to as an in-focus state focusing position.

FIGS. 3 and 4 represent an example of the characteristics when a general three-dimensional subject shown in FIG. 2 is photographed, for example, when an animal (a dog) is photographed on the outdoor location. In a case of the three-dimensional subject, the in-focus state focusing positions in each of the in-focus detection regions 200a, 200b, 200c, 202, 204, 206, and 208 are different from each other. For example, the in-focus detection regions 200a, 200b, and 200c on the center portion correspond to the position of the dog, that is, the subject, and thus, the distance to the subject is about 0.79 m to 0.83 m (in-focus state focusing positions: 18-19). In addition, the in-focus detection regions 202 and 204 on upper corners correspond to the position of a wall, and thus, the distance to the subject is about 1.15 m to 1.25 m (in-focus state focusing positions: 12-13). In addition, the in-focus detection regions 206 and 208 on lower two corners correspond to the position of a ground that is in front of the dog, and thus, the distance to the subject is about 0.65 m (in-focus state focusing position: 23).

Figure 5:
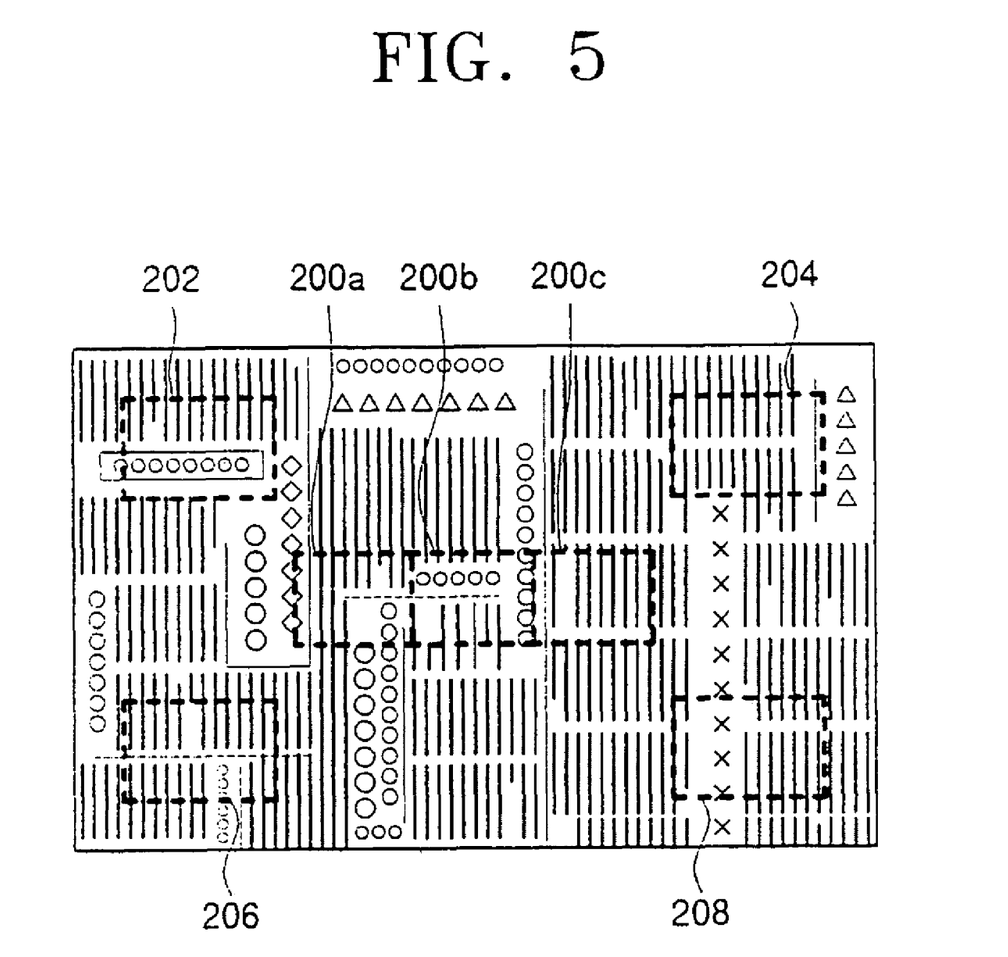
FIG. 5 is a figure showing an example of a flat subject, that is, a sheet of paper on which characters are printed, disposed in perpendicular to an optical axis and photographed.
Figure 6:
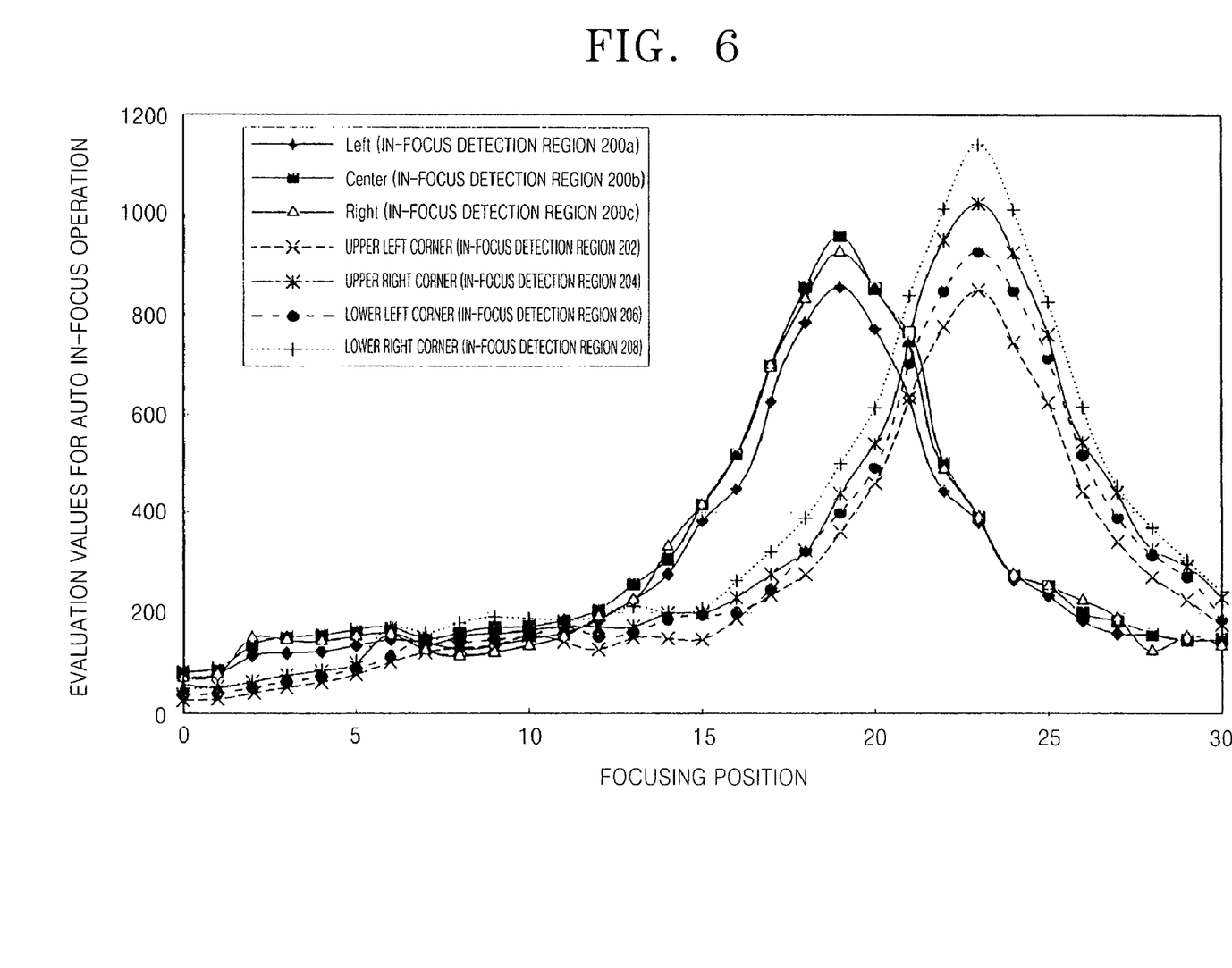
FIG. 6 is a graph showing exemplary evaluation values for auto in-focus operation obtained in the in-focus detection regions in a case where the flat subject of FIG. 5 is photographed.
Figure 7:
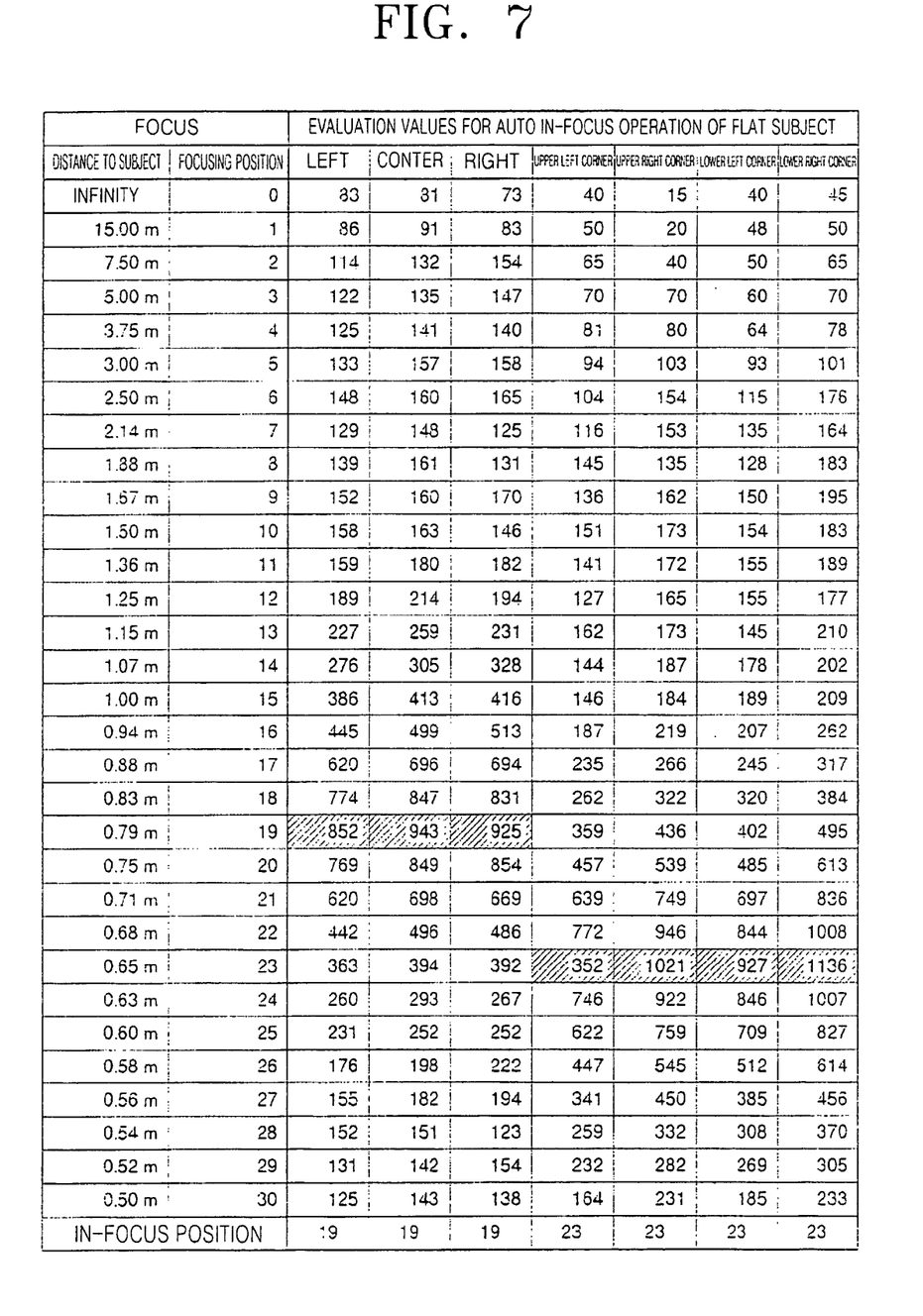
FIG. 7 is a table showing exemplary evaluation values for the auto in-focus operation of FIG. 6 and data of focusing positions (distances to the subject) corresponding to each other.

FIG. 5 shows an example of a state where a sheet of paper on which characters are printed is arranged perpendicular to an optical axis of the zoom lens 102 and the focus lens 108 and is photographed. FIG. 6 shows exemplary evaluation values for the auto in-focus operation obtained from the in-focus detection regions 200a, 200b, 200c, 202, 204, 206, and 208 in a case where the flat subject of FIG. 5 is photographed. In addition, FIG. 7 is a table showing exemplary evaluation values for the auto in-focus operation and the focusing positions (distances to the subject) corresponding to each other.

In a case of the flat subject, the distances to the subject at the in-focus detection regions 200a, 200b, 200c, 202, 204, 206, and 208 are the same as each other, and thus, the in-focus state focusing positions of the in-focus detection regions 200a, 200b, 200c, 202, 204, 206, and 208 are identical to each other. However, as shown in FIGS. 5 and 6, the in-focus state focusing positions on the peripheral portion are nearer than the in-focus state focusing positions on the center portion are because of an aberration of the lens.

Therefore, the in-focus state focusing position obtained from the three in-focus detection regions 200a, 200b, and 200c on the center portion is at step 19, and when the focus lens 108 is driven to the position, the best focusing position is obtained at the center portion. However, the in-focus state focusing position of the peripheral portion is at step 23, and thus, the focus at the peripheral portion is different from the best focus position of the center portion by about 4 steps. In addition, if the in-focus state focusing position of the peripheral portion is different from the in-focus state focusing position of the center portion by more than an allowable defocus amount, the degradation of the resolution at the peripheral portion cannot satisfy a standard of the image quality.

The allowable defocus amount will be described as follows. When it is assumed that a pitch of the pixel in the imaging device is 2 μm, the focusing distance (f) of the lens is 6.3 mm, and FNo. of the diaphragm is F2.8, a diameter of an allowable circuit of confusion can be calculated by following Equation 1.

$$\text{Diameter of circle of confusion} = 2[\mu m] \times \sqrt{2} = 2\sqrt{2}[\mu m] \quad (1)$$

In addition, since the allowable defocus amount can be calculated by multiplying the diameter of the allowable circle of confusion with the diaphragm value, and thus, can be represented as following Equation 2.

$$\begin{aligned}\text{allowable defocus amount} &= \text{diameter of allowable} \\ &\quad \text{circle of confusion} \times FNo. \\ &= 2\sqrt{2} \times 2.8 \\ &\approx 8 \, [\mu m]\end{aligned} \quad (2)$$

In addition, a defocused amount (DF) to the subject can be calculated using following Equation 3.

$$DF = f \times \frac{f}{\text{distance to subject}} - f \times \frac{f}{\text{distance to subject currently focused}} \quad (3)$$

From the above Equation 3, in the photographing apparatus 100 of the current embodiment, the allowable defocused amount is about 3 steps of the focusing positions in FIGS. 4 through 7. Therefore, the allowable defocus range with respect to the in-focus state focusing position is ±3 steps or less. That is, unless the focusing position is in the range of ±3 steps from the in-focus state focusing position, the in-focus state cannot be satisfied.

Therefore, according to this embodiment, when the flat subject is photographed, the final focusing position is determined so that both of the in-focus state focusing positions (peak of the evaluation values for the auto in-focus operation) of the center in-focus detection regions 200a, 200b, and 200c and the in-focus state focusing positions of the peripheral in-focus detection regions 202, 204, 206, and 208 can exist in a range of the predetermined allowable defocused amount, and thus, the resolution of the peripheral portion can be improved without excessively degrading the resolution of the center portion.

In each of the in-focus detection regions 200a, 200b, 200c, 202, 204, 206, and 208, the image to be photographed is the clearest in the state where the focus lens 108 is driven to the in-focus state focusing position. However, if the focus lens 108 is located in the range of the allowable defocused amount with respect to the in-focus focusing position, the focus of the image can be satisfied.

In the example of FIGS. 6 and 7, the final focusing position is an intermediate location between the in-focus state focusing position (19) obtained from the center in-focus detection regions 200*a*, 200*b*, and 200*c* and the in-focus state focusing position (23) obtained from the peripheral in-focus detection regions 202, 204, 206, and 208. Therefore, the in-focus state focusing positions of the center in-focus detection regions 200*a*, 200*b*, and 200*c* and the in-focus state focusing positions of the peripheral in-focus detection regions 202, 204, 206, and 208 are within 6 steps of each other. Therefore, the in-focus state can be satisfied at the center portion and the peripheral portion.

In addition, in the case where the flat subject is photographed, the final focusing position is determined as an average value of the in-focus state focusing positions of the in-focus detection regions 200*a*, 200*b*, 200*c*, 202, 204, 206, and 208, or an intermediate position between the maximum and the minimum in-focus state focusing positions of the in-focus detection regions.

Also, in a case where the in-focus state focusing positions of the peripheral in-focus detection regions 202, 204, 206, and 208 are within 3 steps with respect to the in-focus state focusing positions of the center in-focus detection regions 200*a*, 200*b*, 200*c*, the in-focus state focusing position of the center in-focus detection regions can be set as the final focusing position. In addition, in this case, the final focusing position can be obtained by applying a weight to the in-focus state focusing position of the center in-focus detection regions to obtain the weighted average of the focusing positions on the all of the in-focus detection regions.

Furthermore, the changed amount of the focusing position in each of the steps can be differentiated by designed values (focusing distance, a resolution of an encoder detecting the focusing position, etc.) of the lens unit in the photographing apparatus 100. Therefore, the number of steps of the focusing position corresponding to the allowable defocused amount varies depending on the kind of lens.

In addition, a method of determining whether the subject is the flat subject or not from the evaluation values for the in-focus operation, which are sequentially calculated, will be described with reference to FIGS. 3 and 4. First, among the three in-focus detection regions 200*a*, 200*b*, and 200*c* on the center portion, the region having the closest distance to the subject is selected, and then, it is determined that the main subject exists on the selected region. In the example of FIGS. 3 and 4, since the distance from the in-focus state focusing position (position 19) of the in-focus detection region 200*b* is closest to the subject, the subject at the in-focus detection region 200*b* is the main subject, and then, the in-focus state focusing position is set as position 19.

In addition, the in-focus state focusing positions of the four peripheral in-focus detection regions 202, 204, 206, and 208 are compared with the in-focus state focusing position (=19) of the selected in-focus detection region 200*b*. The focusing positions of the in-focus detection regions 206 and 208 on the lower corners are different from the in-focus state focusing position (position 19) of the in-focus detection region 200*b* by 4 steps towards the minimum focal length. In addition, the focusing positions of the in-focus detection regions 202 and 204 on the upper corners are different from the in-focus state focusing position (19) of the in-focus detection region 200*b* by 6-7 steps toward infinity.

Whether a difference between the in-focus state focusing position of the in-focus detection region 200*a* and the in-focus state focusing positions of the peripheral in-focus detection regions 202, 204, 206, and 208 is within a range of twice of the allowable defocused amount, that is, 6 steps of the focusing position is used to determine whether the subject is a flat subject. That is, when the difference between the maximum and minimum in-focus state focusing positions of the in-focus detection regions 200*a*, 200*b*, 200*c*, 202, 204, 206, and 208 is within the range of twice the allowable defocused amount, it can be determined that the subject is the flat subject. Otherwise, a difference between the in-focus state focusing distances can be used to determine whether the subject is flat.

In the example of FIGS. 3 and 4, the in-focus state focusing positions of the in-focus detection regions 200*a*, 200*b*, 200*c*, 202, 204, 206, and 208 are within a range of 10-11 steps of the focusing position, which is greater than the 6 steps, that is, twice of the allowable defocused amount, and thus, the subject is determined as a non-flat subject.

If the subject is not determined to be the flat subject, results of detecting the in-focus positions on the peripheral in-focus detection regions become invalid, and the in-focus state focusing position (19) of the in-focus detection region 200*b* that is closest to the subject among the center in-focus detection regions 200*a*, 200*b*, and 200*c* is set as the final focusing position. In addition, the focus lens 108 is driven to the final focusing position, and the photographing of the image is performed.

On the other hand, in the example of FIGS. 5 and 6, the difference between the in-focus state focusing position of the center in-focus detection region 200*a* and the in-focus state focusing positions of the peripheral in-focus detection regions 202, 204, 206, and 208 is less than the 6 steps, which is twice of the allowable defocused amount, and the subject is determined as the flat subject.

In a case where the subject is determined as the flat subject, the focusing position 21 that is the intermediate value between the maximum and minimum in-focus positions is determined as the final focusing position so that the in-focus state focusing positions of the in-focus detection regions 200*a*, 200*b*, 200*c*, 202, 204, 206, and 208 are all within the range of twice the allowable defocused amount, and then, the focus lens 108 is driven to the final focusing position.

Therefore, since the focusing position is out of the best focusing position on the center in-focus detection regions 200*a*, 200*b*, and 200*c*, the in-focus state of the center portion is slightly degraded, however, the in-focus state of the peripheral portion can be improved. Hence, the in-focus state of the entire screen can satisfy the standard resolution.

In addition, in order to prevent the in-focus state of the center portion from being degraded, a process for emphasizing an image contour is performed. The process for emphasizing the image contour can be a matrix processing of 5×5, or any other suitable processing.

In addition, when the flat subject is photographed, if the difference between the maximum and minimum in-focus state focusing positions of the in-focus detection regions 200*a*, 200*b*, 200*c*, 202, 204, 206, and 208 is not within the range of twice of the allowable defocused amount, a focusing position satisfying the in-focus state of the entire screen does not exist. Then, an aperture of the diaphragm is reduced to improve the in-focus state of the entire screen. When the diaphragm is reduced, a depth of field is deepened, degradation of the evaluation values for the auto in-focus operation can be reduced, the allowable defocused amount is increased, and the aberration such as the field curvature can be reduced.

As described above, the diaphragm value and the allowable defocused amount are in proportion to each other, for example, the diaphragm value is changed from F2.8 to F5.6, the allowable defocused amount is also increased twice.

Figure 8:
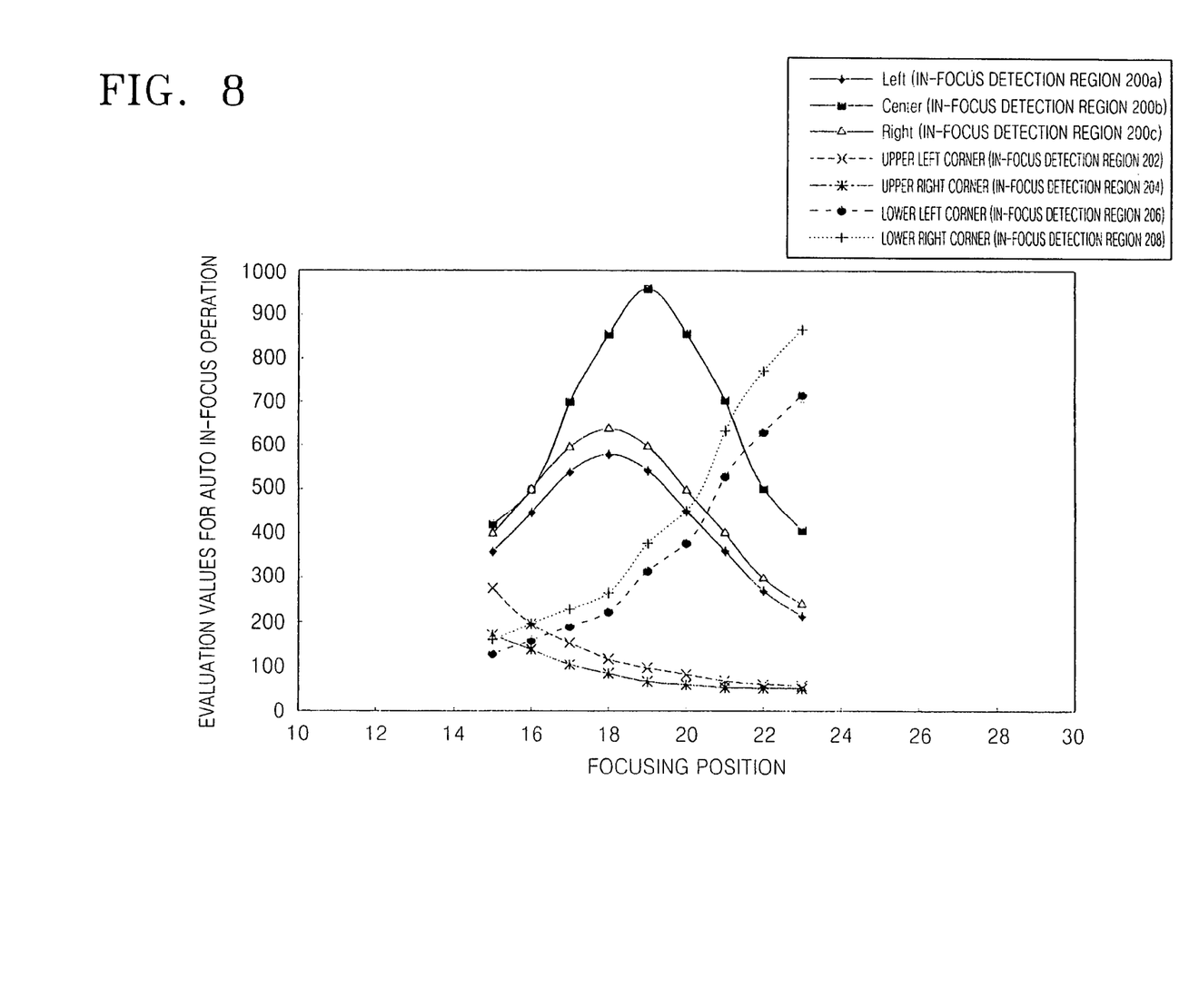
FIG. 8 is a graph showing, in detail, a portion around the focusing position of FIG. 6.

FIG. 8 is a graph showing, in more detail, an adjacent portion of the focusing position (19) shown in FIG. 6. As described above, the flat subject can be determined according to whether the in-focus state focusing positions of the center in-focus detection regions 200a, 200b, and 200c and the in-focus state focusing positions of the peripheral in-focus detection regions 202, 204, 206, and 208 are within 6 steps of the position, that is, twice of the allowable defocused amount, or not. Accordingly, the flat subject can be determined using the adjacent portion of the in-focus state focusing position of the center in-focus detection regions 200a, 200b, and 200c to calculate the evaluation values for the auto in-focus operation of the peripheral in-focus detection regions 202, 204, 206, and 208.

In FIG. 8, the evaluation values for the auto in-focus operation of the in-focus detection regions 202, 204, 206, and 208 are calculated within the range of 6 steps that is twice of the allowable defocused amount based on the in-focus state focusing position of the center in-focus detection region 200b, and if there is no peak in the evaluation values for the auto in-focus operation of the in-focus detection regions 202, 204, 206, and 208 within 6 steps, the subject can be determined as the three-dimensional subject. Through the above process, the processing amount to determine a flat subject can be minimized.

In addition, if the subject is the three-dimensional subject, the posture of the photographing apparatus can be determined based on the evaluation values for the auto in-focus operation of the in-focus detection regions 202, 204, 206, and 208. As shown in FIGS. 3 and 4, in a case where the in-focus state focusing positions of the lower two in-focus detection regions 206 and 208 are nearer than the in-focus state focusing positions of the center in-focus detection regions 200a, 200b, and 200c are, or in a case where the in-focus state focusing positions of the upper two in-focus detection regions 202 and 204 are farther than the in-focus state focusing positions of the center in-focus detection regions 200a, 200b, and 200c are, it can be determined that a near subject such as ground is located on the lower portion of the screen and a far subject such as sky is located on the upper portion of the screen based on the main subject such as a person on the center portion of the screen. Therefore, in this case, it can be determined that the photographing is performed in a state that the screen is disposed in a horizontal direction.

Figure 9:
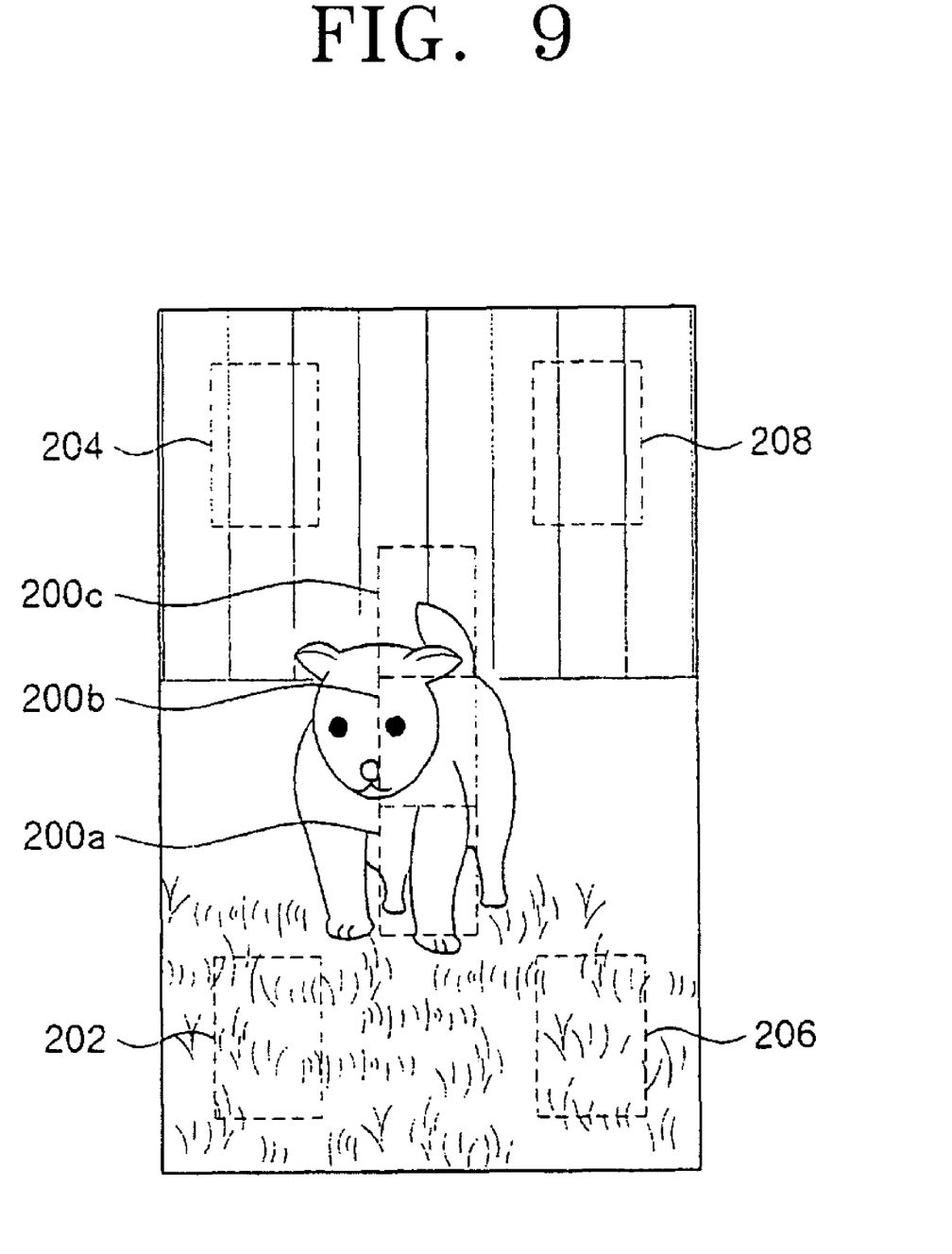
FIG. 9 is a figure showing the subject of FIG. 2 that is photographed in a longitudinal direction.
Figure 10:
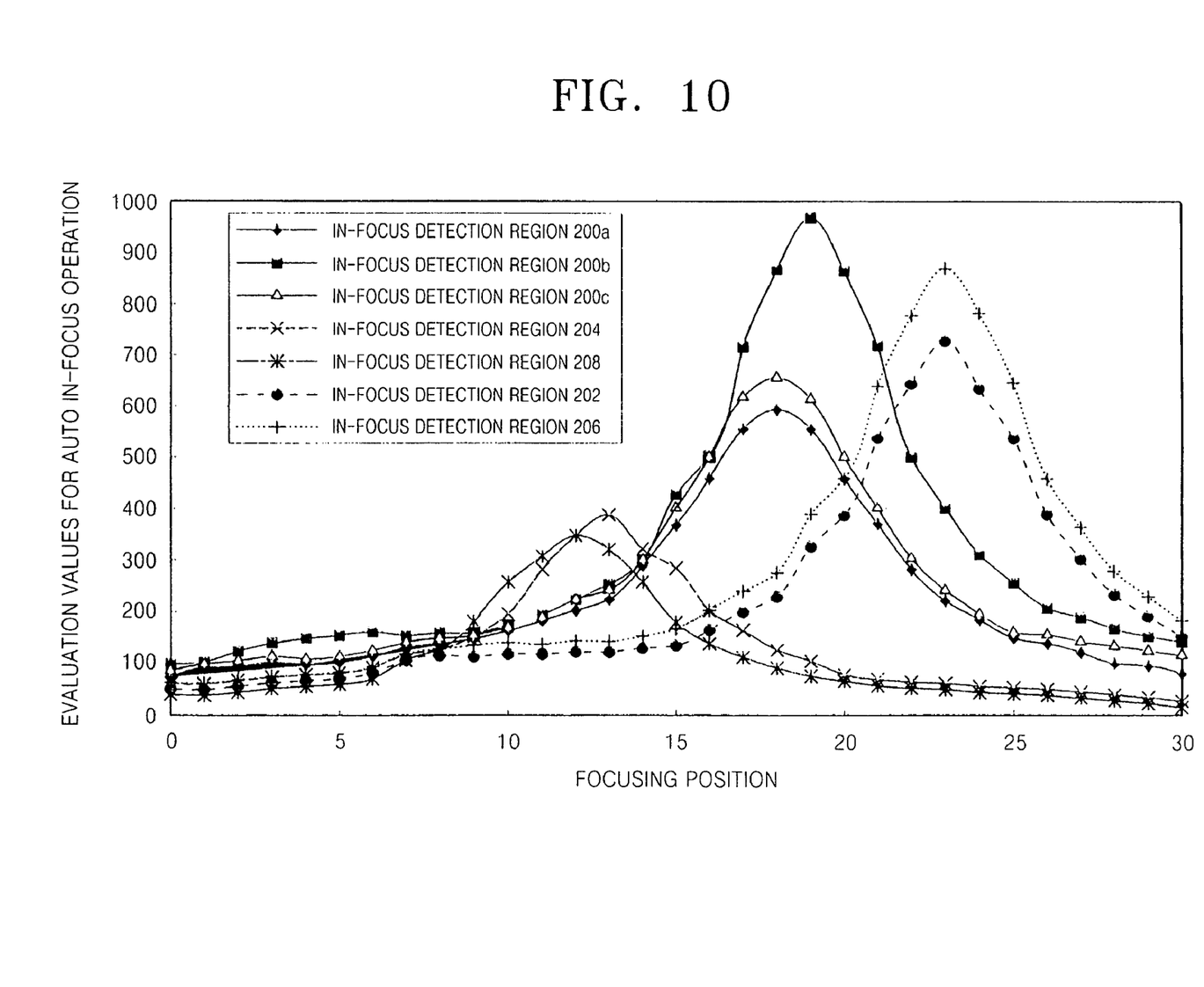
FIG. 10 is a graph showing exemplary evaluation values for auto in-focus operation obtained in in-focus detection regions in a case where the photographing is performed in the state of FIG. 9.

FIG. 9 shows that the subject of FIG. 2 is photographed in a state that the screen is disposed in a vertical direction. In addition, FIG. 10 is a graph showing exemplary evaluation values for auto in-focus operation obtained from the in-focus detection regions when the photographing is performed in the state of FIG. 9. In this case, with respect to the main subject (a dog), the near subject such as ground is located on the lower portion of the screen (which in FIG. 2 was a side portion of the screen), and a far subject such as a wall is located on the upper portion of the screen (which in FIG. 2 was the other side portion of the screen). Therefore, as shown in FIG. 10, the in-focus state focusing positions of the in-focus detection regions 202 and 206 are located on nearer position than the in-focus state focusing positions of the center in-focus detection regions 200a, 200b, and 200c, and the in-focus state focusing positions of the in-focus detection regions 204 and 208 are located on farther position than the in-focus state focusing positions of the center in-focus detection regions 200a, 200b, and 200c, and then, it can be determined that the photographing is performed in a state that the screen is disposed in the vertical direction.

Therefore, according to the embodiment described above, the posture of the photographing apparatus 100 can be detected without forming an additional sensor for detecting the posture of the photographing apparatus 100. In addition, based on the result of detecting the posture of the photographing apparatus 100, the AE or the white balance can be optimally controlled. Therefore, for example, when it is determined that the photographing is performed in the state where the screen is disposed in the horizontal direction, it can be assumed that the sky or the sun is located on the upper portion of the screen, and thus, the AE control can be performed optimally. In addition, posture data is attached to the photographed image, and thus, the image can be displayed a vertical or horizontal position according to the posture during the photographing.

Figure 11:
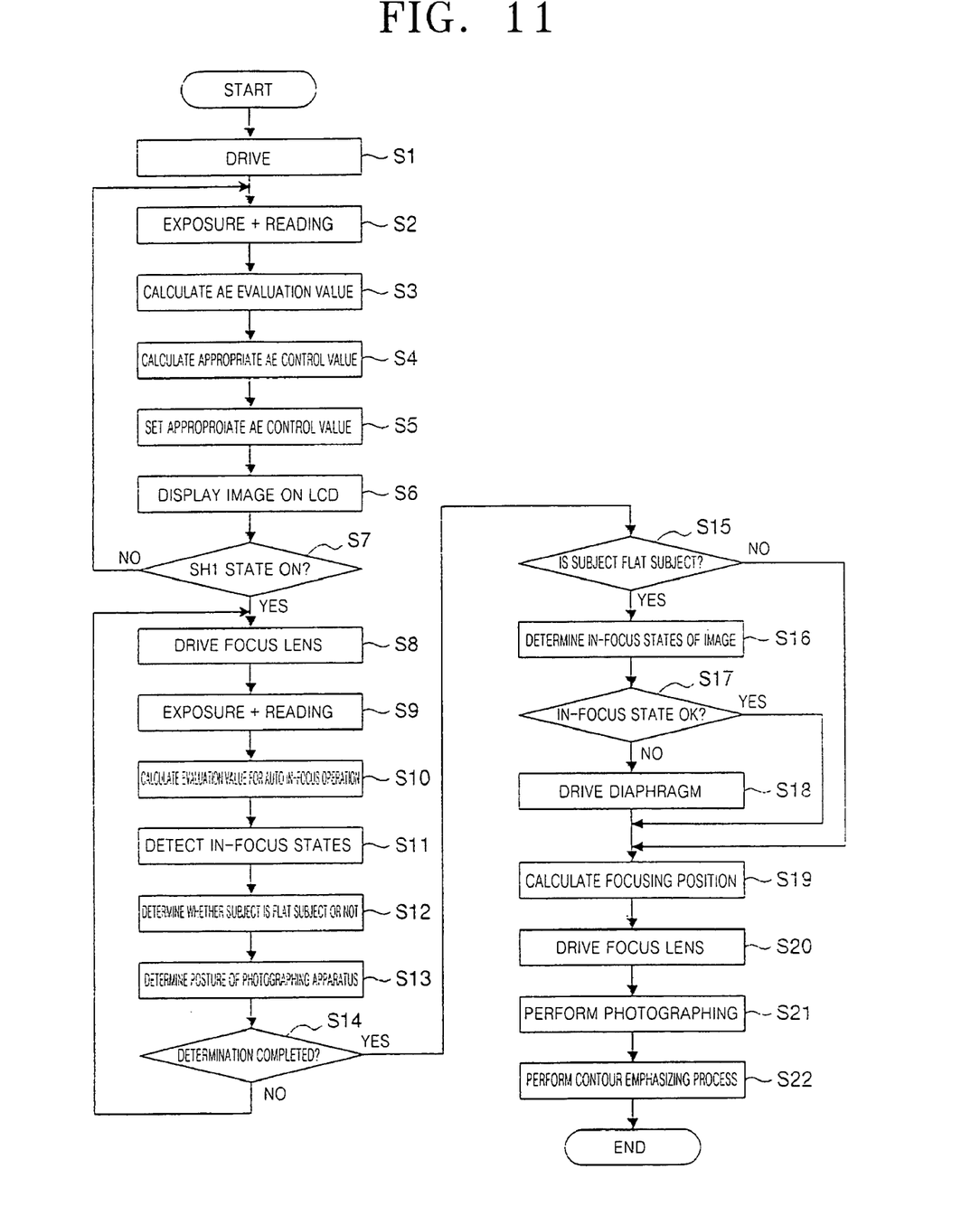
FIG. 11 is a flowchart illustrating exemplary operations of the photographing apparatus according to the embodiment of the present invention.

In addition, an example of the operations performed by the photographing apparatus 100 will be described with reference to FIG. 11. First, in step S1, a power of the photographing apparatus 100 is turned on to drive the photographing apparatus 100. The exposure of the CCD 110 is performed, and the CCD 110 reads image data in step S2. Next, the AE evaluation value is calculated based on the signal of the CCD 110 (step S3).

In addition, an appropriate AE control value is calculated based on the AE evaluation value calculated in process of step S3 (step S4). Here, the diaphragm value and an appropriate shutter speed value are calculated. Next, the appropriate AE control value is set (step S5).

In step S6, the image is displayed on the LCD 126 (live view display) based on the signal read by the CCD 110. It is determined that the shutter button 132 is half-pushed (SH1 state) or not in step S7. If the shutter button 132 is in the SH1 state, the process proceeds to step S8. On the other hand, if the shutter button 132 is not in the SH1 state, the process returns to step S2.

The focus lens 108 is driven from the near position (minimum focal length) to the far position (infinity) in step S8. Next, the exposure of the CCD 110 is performed and the CCD 110 reads the image signal in step S9. Then, evaluation values for auto in-focus operation of the in-focus detection regions 200a, 200b, 200c, 202, 204, 206, and 208 are determined based on the signal of the CCD 110 (S10).

The in-focus states in the in-focus detection regions 200a, 200b, 200c, 202, 204, 206 are detected based on the evaluation values for the auto in-focus operation in step S11. In addition, it is determined whether the subject is a flat subject or not based on the in-focus state focusing positions of the in-focus detection regions 200a, 200b, 200c, 202, 204, 206, and 208 in step S12. Thus, the flat subject can be determined according to whether the in-focus state focusing positions of the in-focus detection regions are within a predetermined range of focusing position steps. In addition, in the process, since it is determined whether the in-focus state focusing positions of the in-focus detection regions are within a range that is twice the allowable defocused amount determined in step S17, the flat subject can be determined within a range that is wider than twice of allowable defocusing amount in step S12. In step S13, the posture of the photographing apparatus is determined based on the in-focus state focusing positions of the in-focus detection regions.

In step S14, it is determined whether the determination of S12 is completed or not. Thus, it is determined whether the evaluation values for auto in-focus operation are obtained as required, and whether the determination of the flat subject is completed or not. At the same time, it is determined whether the posture of the photographing apparatus 100 is completed or not.

In the case where the determination of the flat subject is completed in step S14, the process continues to step S15. Meanwhile, when it is determined that the determination is not completed in step S14, the process returns to step S8, the focus lens 108 is further driven, and after that, the evaluation values for the auto in-focus operation of the in-focus detection regions are calculated.

In step S15, if the subject is the flat subject, the process continues to step S16, and if the subject is not the flat subject, the process jumps ahead to step S19. In step S16, a determination of the in-focus states in the in-focus detection regions is performed, and in step S17, it is determined whether the in-focus states in the in-focus detection regions are within the allowable range. Thus, it is determined whether the in-focus state focusing positions of the in-focus detection regions are within the range of twice of the allowable defocused amount.

In a case where the in-focus states of the in-focus detection regions are in the allowable range in step S17, of the process jumps ahead to step S19, and the final focusing position is calculated based on the in-focus state focusing positions of the in-focus detection regions. If the in-focus states of the in-focus detection regions are determined to be not satisfactory in step S17 (for example, the in-focus state focusing position slightly exceeds the allowable range), a process of driving the diaphragm to increase the allowable defocused amount is performed in step S18. Next, in step S19, the final focusing position is calculated based on the in-focus state focusing positions in the in-focus detection regions.

In step S20, the focus lens 108 is driven to the final focusing position. In step S21, the photographing is performed by operating the combined diaphragm and shutter. In step S22, a process for emphasizing the image contours of the photographed image data is performed. Then, the photographing process is completed (END).

According to the embodiment of the present invention described above, the determination of whether the subject is a flat subject is performed based on the evaluation values for the auto in-focus operation obtained from the in-focus detection regions 200*a*, 200*b*, 200*c*, 202, 204, 206, and 208. In addition, if the subject is a flat subject, the final focusing position is determined so that the in-focus state focusing positions of the in-focus detection regions 200*a*, 200*b*, 200*c*, 202, 204, 206, and 208 can be within the range of twice an allowable defocused amount, and thus, the degradation of the resolution on the peripheral portion of the image caused by the aberration of the lens can be minimized.

In addition, the focusing position is adjusted even though the user does not notice in the case of the flat subject, and thus, an inconvenient operation such as a mode changing is not necessary. In addition, when the flat subject such as a sheet of paper on which characters are printed is photographed, the degradation of resolution on the peripheral portion of the image can be prevented.

As can be appreciated from the above, according to the photographing apparatus and the photographing method of the embodiments of the present invention, the degradation of resolution on the peripheral portion of the image can be prevented using a simple structure and simple method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographing apparatus comprising:
   an in-focus state detector for detecting evaluation values for auto in-focus operation representing an in-focus state of a photographing image from a first in-focus state detection region disposed on a center portion of the photographing image, and at least one second in-focus state detection region disposed on a peripheral portion of the photographing image;
   a flat subject determiner that determines whether a subject to be photographed is a flat subject based on the detection result of the evaluation values for auto in-focus operation;
   a flat subject focusing position calculator that calculates a final focusing position based on the evaluation values for auto in-focus operation obtained from the first and second in-focus detection regions, when the subject is determined as a flat subject by the flat subject determiner; and
   a three-dimensional subject focusing position calculator that calculates a final focusing position based on the evaluation value for auto in-focus operation obtained from the first detection region, when it is determined that the subject is not a flat subject by the flat subject determiner.

2. The photographing apparatus of claim 1, wherein the flat subject determiner determines whether the subject is a flat subject based on a difference between a focusing position where the evaluation value for auto in-focus operation of the first in-focus detection region is a maximum and a focusing position where the evaluation value for auto in-focus operation of the second in-focus detection region is a maximum.

3. The photographing apparatus of claim 1, further comprising:
   a display unit displaying the photographing image,
   wherein the first in-focus detection region is displayed on the display unit with the photographing image, and the second in-focus detection region is not displayed on the display unit.

4. The photographing apparatus of claim 1, further comprising:
   a diaphragm value controller that changes a diaphragm value based on the determination result of the flat subject determiner.

5. The photographing apparatus of claim 1, further comprising:
   a contour emphasizing controller that changes a process of emphasizing a contour of the image based on the determination result of the flat subject determiner.

6. The photographing apparatus of claim 1, further comprising:
   a posture determiner that determines a posture of the photographing apparatus based on the evaluation values for auto in-focus operation of the first and second in-focus detection regions.

7. The photographing apparatus of claim 1, wherein:
   the in-focus state detector detects evaluation values for auto in-focus operation representing an in-focus state of a photographing image from a first in-focus state detection region disposed on a center portion of the photographing image, and a plurality of said second in-focus state detection regions disposed on a peripheral portion of the photographing image.

8. A photographing method comprising:
   detecting evaluation values for auto in-focus operation, which represent in-focus states, from a first in-focus detection region on a center portion of a photographing image and at least one second in-focus detection region on a peripheral portion of the photographing image;

determining whether a subject to be photographed is a flat subject based on the result of detecting the evaluation values for auto in-focus operation from the first and second in-focus detection regions;

calculating a final focusing position based on the evaluation values for auto in-focus operation from the first and second in-focus detection regions if the subject is determined as a flat subject; and calculating a final focusing position based on the evaluation value for the auto in-focus operation obtained from the first in-focus detection region if the subject is determined to not be a flat subject.

9. The photographing method of claim 8, wherein in determining whether the subject is a flat subject, the flat subject is determined based on a difference between a focusing position where the evaluation value for auto in-focus operation of the first in-focus detection region is a maximum and a focusing position where the evaluation value for auto in-focus operation of the second in-focus detection region is a maximum.

10. The photographing method of claim 8, further comprising:

displaying the photographing image, wherein the first in-focus detection region is displayed with the photographing image, and the second in-focus detection region is not displayed.

11. The photographing method of claim 8, wherein in determining whether the subject is a flat subject, a diaphragm value is changed based on the result of determining whether the subject is a flat subject.

12. The photographing method of claim 8, wherein in determining whether the subject is a flat subject, a process of emphasizing a contour of the image is changed based on the result of determining whether the subject is a flat subject.

13. The photographing method of claim 8, further comprising:

determining a posture of the photographing apparatus based on the evaluation values for auto in-focus operation of the first and second in-focus detection regions.

14. The photographing method of claim 8, wherein:

the detecting detects evaluation values for auto in-focus operation representing an in-focus state of a photographing image from a first in-focus state detection region disposed on a center portion of the photographing image, and a plurality of said second in-focus state detection regions disposed on a peripheral portion of the photographing image.

15. A computer readable medium of instructions for controlling a photographing apparatus, comprising:

a first set of instructions for controlling the photographing apparatus to detect evaluation values for auto in-focus operation, which represent in-focus states, from a first in-focus detection region on a center portion of a photographing image and at least one second in-focus detection region on a peripheral portion of the photographing image;

a second set of instructions for controlling the photographing apparatus to determine whether a subject to be photographed is a flat subject based on the result of detecting the evaluation values for auto in-focus operation from the first and second in-focus detection regions;

a third set of instructions for controlling the photographing apparatus to calculate a final focusing position based on the evaluation values for auto in-focus operation from the first and second in-focus detection regions if the subject is determined as a flat subject; and a fourth set of instructions for controlling the photographing apparatus to calculate a final focusing position based on the evaluation value for the auto in-focus operation obtained from the first in-focus detection region if the subject is determined to not be a flat subject.

16. The computer readable medium of instructions of claim 15, wherein the second set of instructions controls the photographing apparatus to determine whether the subject is a flat subject based on a difference between a focusing position where the evaluation value for auto in-focus operation of the first in-focus detection region is a maximum and a focusing position where the evaluation value for auto in-focus operation of the second in-focus detection region is a maximum.

17. The computer readable medium of instructions of claim 15, further comprising:

a fifth set of instructions for controlling the photographing apparatus to display the photographing image, wherein the first in-focus detection region is displayed with the photographing image, and the second in-focus detection region is not displayed.

18. The computer readable medium of instructions of claim 15, wherein the second set of instructions controls the photographing apparatus to determine whether the subject is a flat subject and change a diaphragm value based on the result of determining whether the subject is a flat subject.

19. The computer readable medium of instructions of claim 15, wherein the second set of instructions controls the photographing apparatus to determine whether the subject is a flat subject by changing a process of emphasizing a contour of the image based on the result of determining whether the subject is a flat subject.

20. The computer readable medium of instructions of claim 15, further comprising:

a sixth set of instructions for determining a posture of the photographing apparatus based on the evaluation values for auto in-focus operation of the first and second in-focus detection regions.

* * * * *